(12) United States Patent
Helgren

(10) Patent No.: US 6,200,204 B1
(45) Date of Patent: Mar. 13, 2001

(54) ROLL GRINDER WITH VIBRATION DAMPENING

(75) Inventor: Dale Helgren, Green Bay, WI (US)

(73) Assignee: Voith Sulzer Paper Technology North America, Inc., Appleton, WI (US)

( * ) Notice: Subject to any disclaimer, the term of this patent is extended or adjusted under 35 U.S.C. 154(b) by 0 days.

(21) Appl. No.: 09/399,274

(22) Filed: Sep. 17, 1999

(51) Int. Cl.⁷ .................................................. B24B 7/00
(52) U.S. Cl. .................. 451/124; 451/142; 451/221; 451/242; 451/8; 451/25; 451/410
(58) Field of Search ................................ 451/142, 221, 451/242, 8, 25, 410

(56) References Cited

U.S. PATENT DOCUMENTS

| | | | |
|---|---|---|---|
| 3,456,395 | * 7/1969 | Parella | 451/11 |
| 3,546,817 | * 12/1970 | Schaller et al. | 451/142 |
| 4,077,163 | * 3/1978 | Bennett, Jr. et al. | 451/123 |
| 5,551,906 | * 9/1996 | Helgreen | 451/8 |
| 5,730,643 | * 3/1998 | Bartlett et al. | 451/8 |

* cited by examiner

Primary Examiner—David A. Scherbel
Assistant Examiner—Shantese McDonald
(74) Attorney, Agent, or Firm—Ostrolenk, Faber, Gerb & Soffen, LLP

(57) ABSTRACT

A roll grinder system including a roll grinder bed of high dynamic stiffness, having a roll support and a grinding wheel support fixedly mounted to the roll grinder bed. The roll grinder bed is comprised of a monolithic epoxy granite block with a steel plate embedded in the top surface and a steel plate embedded in the bottom surface. The bed for the support for the roll being ground is rigidly affixed to the top plate. The bed for the traversing carriage of the grinding wheel head is also rigidly affixed to the top plate. A bed for the caliper is affixed to a lateral side of the block. The grinding wheel and the caliper traverse along the axis of the roll being ground. Vibration isolators are disposed below the bottom plate of the block.

14 Claims, 3 Drawing Sheets

ROLL GRINDER WITH VIBRATION DAMPENING

BACKGROUND OF THE INVENTION

The invention relates to a roll grinder and specifically to a roll grinder which has an improved foundation which insulates the roll grinder from external vibrations.

A conventional roll grinder for which the present invention may be used is disclosed in U.S. Pat Nos. 3,391,497; 4,807,400; and 4,811,524, for example.

Rolls used for producing steel, aluminum, paper, and in other related industries require that the surface of the roll be free from imperfections. Through normal use, the surfaces of the rolls develop imperfections. The roll surfaces are reconditioned by being ground in a roll grinder. Surface imperfections in the rolls may be caused by vibrations imposed upon the grinding machinery by external forces. Some roll grinders are immune to this problem because they are installed in an environment that is essentially free of external vibration. However, most roll grinder installations are disposed near a rolling mill for which the rolls being ground are used, or are near other vibration generating systems, other factory or machinery installations, a railroad track, a roadway, etc. Therefore, there is a need for isolating roll grinders from induced vibrations.

One prior art technique for vibration isolating a roll grinder is now described. A conventional roll grinder has several component parts. Each is on a respective separate bed. The parts include a front bed on which the roll to be ground is supported, a rear bed that supports a carriage for the grinding wheel head and a caliper bed, possibly on the opposite side of the front bed from the carriage bed, on which a roll sensing caliper is supported. Each bed is supported through its own respective isolation supports or rigid supports on a common block. As each component is on its own supports and as the components are of different masses, they can vibrate relative to each other on the common block. To avoid or at least minimize this vibration, a single large concrete block is used as the common block, with a top side shaped and profiled to the machine footprint of the beds and the isolation supports of each of the components. The block is quite large and tall, e.g., 2–3 meters in height. The block is raised and separated from the surrounding building and the ground beneath it by an isolator system for the block comprised of either polymer, rubber, springs, or the like. The size of and supports for the block make it an inertia block which damps vibration of the block and damps relative vibrations of the components and their respective beds. The block has sufficient stiffness to support the accuracy of the grinding process and has sufficient mass to render the appropriate natural frequencies occurring in the particular application. However, because the block 12 typically may be 2–3 meters in height, it provides a very large, costly, and cumbersome foundation. It is installed in and often disposed below the floor level of a shop floor so that the height level of the roll grinder components will be accessible at floor level. This avoids the possibility of repositioning the grinder, except for great effort and expense.

SUMMARY OF THE INVENTION

It is an object of the invention to provide a roll grinder which can damp vibration forces induced on the roll grinder.

Another object is to provide a roll grinder having an isolation system which is smaller than those used for prior art grinders.

A further object is to eliminate individual beds for roll grinder components.

The invention concerns a roll grinder with the conventional components of a grinding wheel on a traversing carriage, a roll support for the roll being ground, and a traversing caliper. Instead of each of these components being on its own independent bed which is supported through a respective isolator system on a large block, the components are all directly fixedly and rigidly attached to a single roll grinder bed comprised of a monolithic isolation block, which yields very high dynamic stiffness, with a very low profile, as compared with the prior art. This machine base is independently rigid without the need for an additional support from a concrete inertia block. Attaching the front, rear and caliper bed sections to one monolithic isolation block and making that block integral with the machine avoids the need for the huge inertia block used in the art. Since the entire machine is rigid, and the components cannot shift relative to one another on their monolithic block vibration, isolators can be placed under the isolation block, isolating the entire system from vibrations of its environment. Further, the reduced height of the isolation block permits it to be disposed above a shop floor rather than in a pit below the floor.

The unitary isolation block includes a composite material block. The block has a first steel plate disposed on the underside of the block and a second steel plate disposed on the upper side of the block. The plates are preferably embedded in the block, i.e. the edges of the plates are surrounded by the composite. Mounting the plates in this manner provides a construction with considerable stiffness in all planes of motion, producing unique characteristics and capabilities of this machine. The steel plates are at the maximum separation distance for the unitary bed for all the components. Combining that with applying the unique characteristics of epoxy granite to the separation layer, unparalleled damping as well as maximizing the mass moment of inertia, and thus stiffness of the block and the bed for the components are achieved.

Although integrally rigid machine tools have been in use for some time, that has never been applied to roll grinders. Further, in most integral rigid machine tool designs, a three point anchoring system is incorporated so that the bed may gain additional support by rigid connection between the three points and the earth. No such connection is needed for this design.

This invention allows a user to avoid the extensive labor which was required to attach a prior art damping device to a roll grinder. Moreover, the overall size of the damping device is much smaller and less cumbersome than that of the prior art.

The foregoing objects and features as well as others will be apparent from the following description and accompanying drawings.

DETAILED DESCRIPTION OF A PRIOR ART EMBODIMENT

Figure 1:
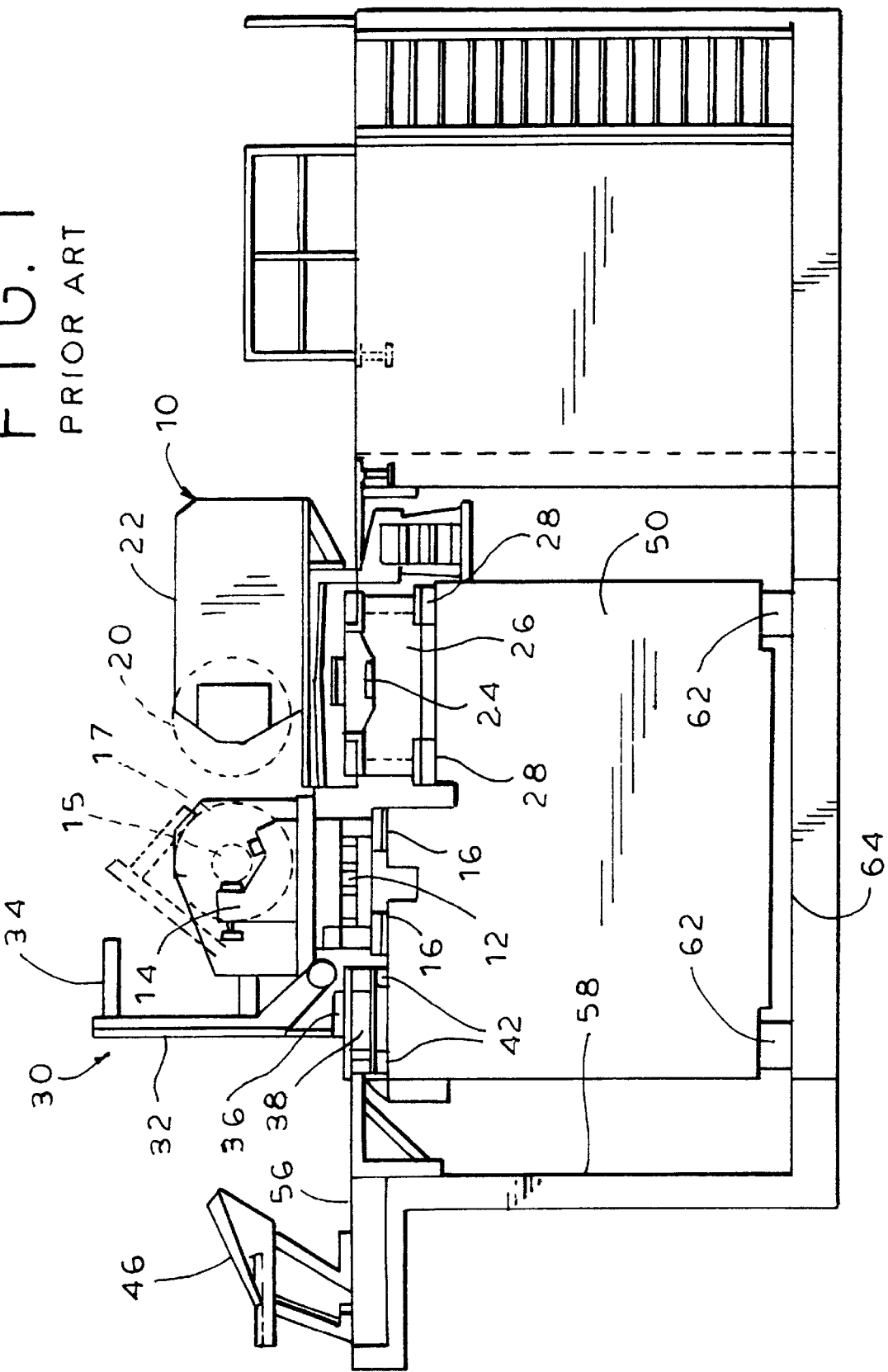
FIG. 1 is a side view of a prior art roll grinder.

FIG. 1 shows a prior art roll grinder 10 which includes several conventionally used grinder components. There is a front bed 12 having a respective roll support 14 at each lateral end on which the journals 15 at the ends of a roll 17 may rest, so that the roll can be rotated at the journals as the roll is being ground. The front bed 12 rests on rigid supports or isolation supports 16 below it comprised of stiff yet resilient material, e.g., an appropriate polymer, rubber or compressed springs.

To grind the roll, a grinding wheel 20 is supported on a wheel pad 22 which in turn is carried on a traversal carriage 24 that is attached to a rear bed 26. The rear bed 26 also rests on rigid supports or isolation supports 28 below it, of the same type as the isolation supports 14. As is conventional, the wheel and wheel head and carriage traverse along the axis of the wheel and parallel to the axis of the roll on the bed 12 for grinding the roll.

Another standard component of a roll grinder is a caliper 30 which includes an arm that is pivotable towards and away from the roll being ground. The arm supports at least one or perhaps two caliper elements which move to the roll being ground and sense its profile and its surface for determining the grinding process. The caliper 30 also is supported on a carriage 36 which in turn is supported on a caliper bed 38 and the caliper bed 38 in turn is supported on rigid supports or isolation supports 42.

The grinding apparatus has other standard components including various drives for rotating the roll, rotating the grinding wheel, traversal of the grinding wheel, movement of the caliper, traversal of the caliper along the axis of the roll, etc., not shown, but well known in the art. An operator station 46 adjacent the apparatus is connected with the various movable elements for controlling their operation.

The three main, separate components and their respective beds 12, 26, 38 are disposed on top of a large concrete block 50. The shapes of the components and their beds and their supports define a footprint for the grinding apparatus. The top of the concrete block is shaped to mate with the footprint of the apparatus. The concrete block is large, being 2–3 meters in height, making it costly and quite heavy so that the block and grinding apparatus are not movable around a shop floor. As illustrated, the concrete block is below the shop floor 56 in a pit 58, and its considerable height and weight prevents it from being relocated elsewhere within the shop.

The concrete block 50 itself is supported on an isolator system comprised of resilient material blocks 62 of polymer, rubber, compressed springs, or the like, as is conventional, which rests on the depressed sub-floor 64 of the shop. Each of the components 10, 20, 30 and its bed 12, 26, 38 is separate from the others so that there is not an integral structure of the components, but rather the components are individually connected with the concrete block 50 by respective isolator systems 16, 28, 42 between the several component beds and the concrete block.

DETAILED DESCRIPTION OF THE PREFERRED EMBODIMENT

Figure 2:
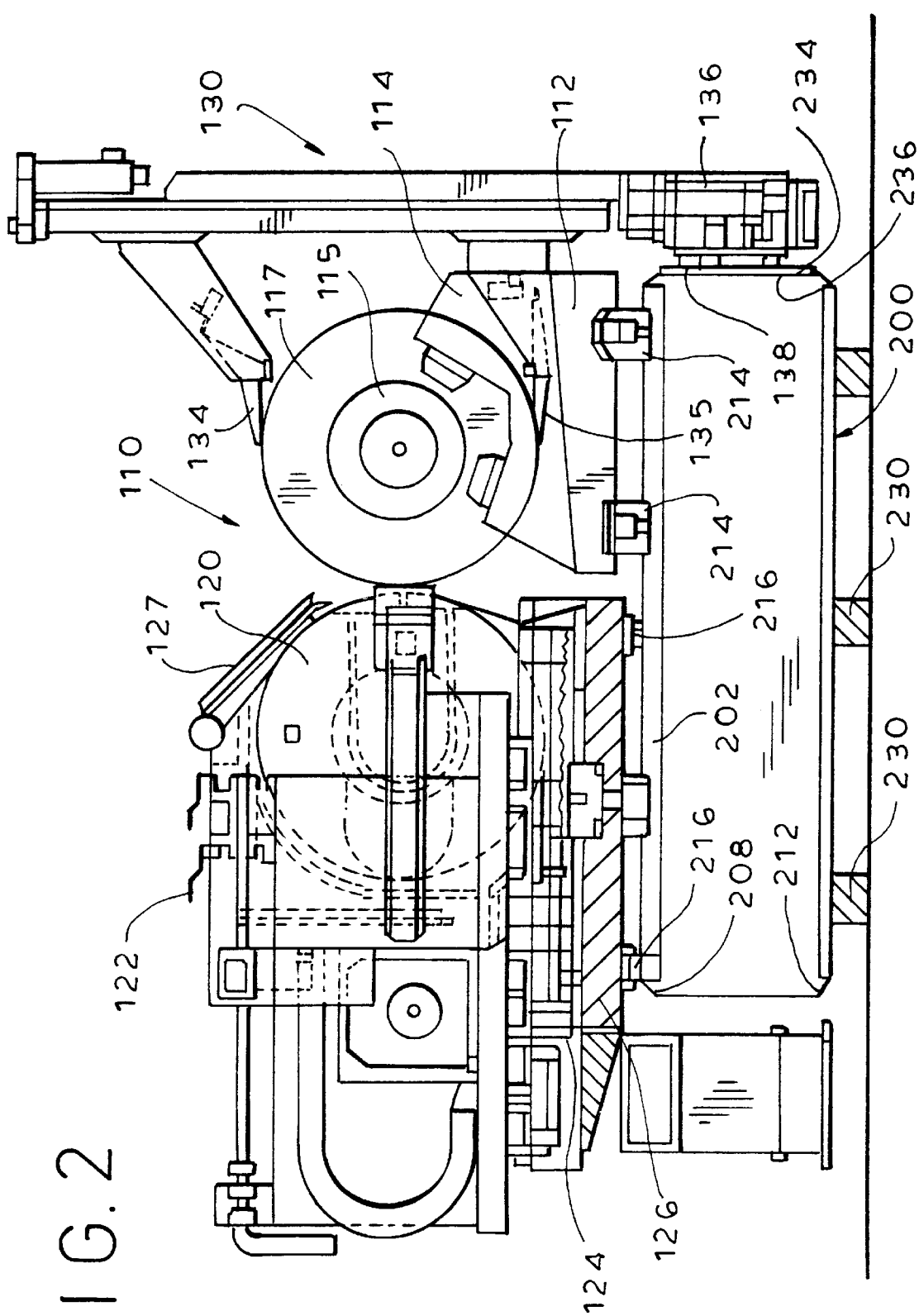
FIG. 2 is a side view of a roll grinder according to the invention.
Figure 3:
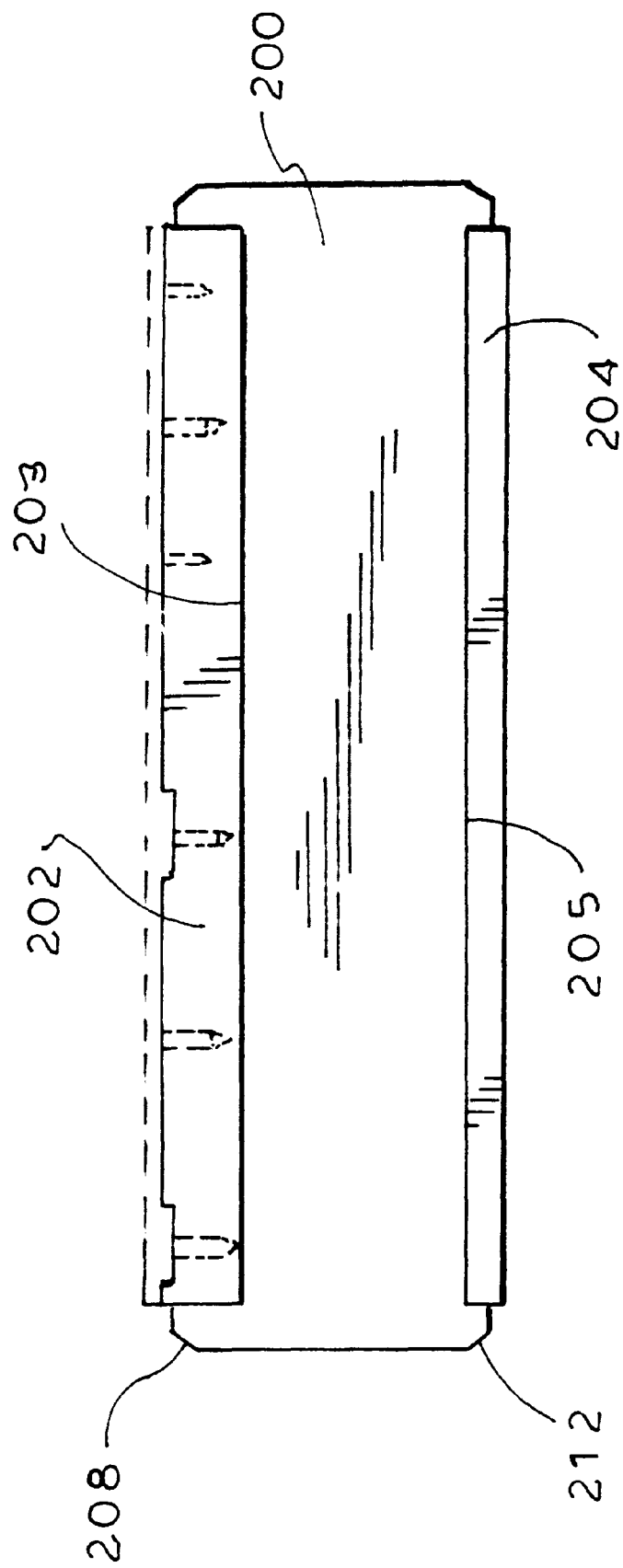
FIG. 3 is a side view of a block and bed for a roll grinder according to the invention.

FIG. 2 shows a roll grinder 110 according to the present invention. Elements in the embodiment of FIG. 2 corresponding to those in the prior art embodiment of FIG. 1 are identified by the same reference numbers raised by 100. Other and different elements are numbered over 200.

In the roll grinder 110, the front bed 112 carries the supports 114 for the journals 115 of the roll 117 to be ground. The roll 117 is conventionally driven to rotate.

The grinding wheel 120 is supported in the wheel head 122 on a conventional traversing carriage 124 which traverses along the axis of the wheel 122 and parallel to the axis of the roll 117. The carriage is supported on a bed 126 with respect to which the carriage 124 and the wheel head 122 traverse. As is conventional, the wheel head is provided with a coolant liquid application system 127 which keeps the grinding wheel and roll cool when they are exposed to the friction of grinding.

There is a caliper system 130 including a first caliper arm 134 and a second caliper arm 135 which senses or measures the roll as it is being ground. The calipers 134, 135 are carried on the caliper carriage 136 which, in turn, is supported on the caliper bed 138 to traverse along the direction parallel to the axis of the roll 117. An example of such a caliper system is disclosed in U.S. Pat. No. 5,551,906.

The principle distinguishing feature of the present invention comprises the roll grinder bed 200. Roll grinder bed 200 is comprised of a monolithic block primarily comprised of epoxy granite composite material. This may be comprised of a granite aggregate of generally uniform size of ¼ to ½ inch average diameter tightly bonded by a slow hardening epoxy resin. The block defines a roll grinder bed of high dynamic stiffness for rigidly and accurately supporting the component supports. The components of the grinder are fixedly and rigidly attached, without interposed isolator systems, to this monolithic block. There are a top plate 202 and a bottom plate 204 on the top 203 and bottom 205 surfaces of the roll grinder bed 200, wherein the plates are preferably of strong steel and are substantially non-yieldable. The surfaces 203, 205 are oriented so that the plates are parallel. Further, the plates 202, 204 are embedded in the respective surfaces 203, 205 so that the edges of the plates are covered at 208, 212 by the block material. This arrangement provides unparalleled dynamic stiffness of the block and bed in all planes of motion.

Rather than being supported on individual resilient isolation elements, the front bed 112 for the roll being ground is fixedly and rigidly fastened, e.g., bolted, and stiffly held to the plate 202 by stiff connections 214.

Similarly, the rear bed 126 for the carriage 124 for the grinding wheel 120 is fixedly and rigidly held to the plate 202 at the connections 216. The bed 112 for the roll and the bed 126 for the grinding wheel are rigidly connected with roll grinder bed 200 and therefore they would not vibrate with respect to each other, as might occur in the prior art arrangement. In this way, all of the elements of the roll grinder are rigidly attached to a single roll grinder bed which has dynamic stiffness so that it may serve as an inertia block for the entire roll grinder apparatus.

Vibration isolators 230 are placed below the lower plate 204 under the block 200 providing the desired isolation from the surrounding environment. Examples of materials of which the isolators may be comprised include a felt and rubber composite, rubber pads or springs.

An additional plate 234 is embedded in a lateral end of 236 of the block 202, by which the caliper assembly 130 is also integrated into the block. Because the plate 234 is on the end of the block, the block can be made smaller than if the caliper bed were on the top of the block.

As the very large poured concrete block of the prior art is no longer needed, the complete machine can be placed directly on a shop floor at any selected location, so long as the floor has sufficient support capacity for the direct weight of the machine. No additional construction work is necessary for placing the grinding machine with the block of the invention at a selected location. This permits lower cost installation and less effort for installation. The above separation of the first and second steel plates at the maximum distance of the height of the block provides the maximum desired damping and a maximum moment of inertia and stiffness.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A roll grinder with vibration resistance, comprising:

a roll grinder bed comprising a monolithic block having a top side and a bottom side; a top plate on the top side of the block;

a roll support and a grinding wheel support fixedly and rigidly mounted on the roll top plate, the roll grinder bed being of high dynamic stiffness for rigidly and accurately supporting the grinding wheel support and the roll support;

the roll support being for supporting a roll to be ground;

a grinding wheel having a rotation axis and being supported on the grinding wheel support, the grinding wheel support traversing in a direction along the axis of the grinding wheel with respect to the roll grinder bed, the grinding wheel being so shaped and the wheel support being so located that as the grinding wheel is rotated and traverses, the grinding wheel grinds a roll on the roll support; and vibration isolators located below the roll grinder bed for flexibly attaching the roll grinder bed on a floor.

2. The grinder of claim 1, wherein the roll grinder bed further comprises:

a bottom plate at the bottom side of the block.

3. The grinder of claim 2, wherein the plates are of steel of a type and thickness as to be rigid.

4. The grinder of claim 3, wherein the plates are embedded in the block such that the material of the block wraps around the edges of the plates.

5. The grinder of claim 2, wherein the plates are oriented parallel to each other.

6. The grinder of claim 1, wherein the top plate is of steel of a type and thickness as to be rigid.

7. The grinder of claim 2, wherein the plates are embedded in the block such that the material of the block wraps around the edges of the plates.

8. The grinder of claim 2, wherein the monolithic block is comprised of an epoxy granite composite.

9. The grinder of claim 1, wherein the vibration isolators comprise resilient supports for the roll grinder bed.

10. The grinder of claim 1, further comprising:

a caliper for sensing a characteristic of the roll being ground, a caliper support for supporting the caliper and for moving the caliper to and away from the roll being ground and for enabling the caliper to sense the characteristic of the roll when the caliper is to the roll, wherein the caliper support and the caliper traverse in a direction along the axis of the roll with respect to the caliper bed.

11. The grinder of claim 10, wherein the caliper support is fixedly and rigidly mounted to the roll grinder bed.

12. The grinder of claim 10, wherein the monolithic block has a lateral side and the caliper support is affixed to the lateral side of the block.

13. The grinder of claim 12, further comprising a further plate at the lateral side of the block embedded in the block and the caliper support is affixed non-vibratingly to the further plate at the side of the block.

14. The grinder of claim 12, wherein the plates are embedded in the block such that the material of the block wraps around the edges of the plates.

* * * * *